(12) United States Patent
Chickering et al.

(10) Patent No.: US 7,251,636 B2
(45) Date of Patent: Jul. 31, 2007

(54) SCALABLE METHODS FOR LEARNING BAYESIAN NETWORKS

(75) Inventors: David M. Chickering, Bellevue, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 10/732,074

(22) Filed: Dec. 10, 2003

(65) Prior Publication Data

US 2005/0131848 A1    Jun. 16, 2005

(51) Int. Cl.
    *G06F 15/18* (2006.01)

(52) U.S. Cl. ....................................... 706/12

(58) Field of Classification Search .................. 706/12
    See application file for complete search history.

(56) References Cited

U.S. PATENT DOCUMENTS

| | | | | |
|---|---|---|---|---|
| 6,058,389 A | * | 5/2000 | Chandra et al. ................ | 707/1 |
| 6,360,224 B1 | * | 3/2002 | Chickering ................... | 707/100 |
| 6,529,888 B1 | * | 3/2003 | Heckerman et al. ........... | 706/45 |
| 6,904,408 B1 | * | 6/2005 | McCarthy et al. ............. | 705/2 |

OTHER PUBLICATIONS

Shulin Yang & Kuo-Chu Chang; Comparison of Score Metrics for Bayesian Network Learning, IEEE Transactions on Systems, Man and Cybernetics—Part A: Systems and Humans, vol. 32, No. 3, May 2002, pp. 419-428.*

Geoff Hulten, David Maxwell Chickering and David Heckerman, Learning Bayesian Networks From Dependency Networks: A Preliminary Study, Proceedings of the 9th International Workshop on Artificial Intelligence and Statistics, Jan. 3-6, 2003, 8pgs, Key West, FL.

David Heckerman, "A Tutorial on Learning With Bayesian Networks", Microsoft Research, Mar. 1995, Revised 1996, 57 pages.

Andrew Moore and Mary Soon Lee, "Cached Sufficient Statistics for Efficient Machine Learning with Large Datasets", 1998, pp. 67-91.

David Heckerman, David Maxwell Chickering, Christopher Meek, Robert Rounthwaite and Carl Kadie, "Dependency Networks for Inference, Collaborative Filtering, and Data Visualization". Microsoft Research. 2000. 32 pgs.

* cited by examiner

*Primary Examiner*—Anthony Knight
*Assistant Examiner*—Michael B. Holmes
(74) *Attorney, Agent, or Firm*—Amin, Turocy & Calvin, LLP

(57) ABSTRACT

The present invention leverages scalable learning methods to efficiently obtain a Bayesian network for a set of variables of which the total ordering in a domain is known. Certain criteria are employed to generate a Bayesian network which is then evaluated and utilized as a guide to generate another Bayesian network for the set of variables. Successive iterations are performed utilizing a prior Bayesian network as a guide until a stopping criterion is reached, yielding a best-effort Bayesian network for the set of variables.

40 Claims, 11 Drawing Sheets

SCALABLE METHODS FOR LEARNING BAYESIAN NETWORKS

TECHNICAL FIELD

The present invention relates generally to data analysis, and more particularly to systems and methods utilizing scalable methods for learning Bayesian networks.

BACKGROUND OF THE INVENTION

With the advent of the Internet, and especially electronic commerce ("e-commerce") over the Internet, the use of data analysis tools, has increased dramatically. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining (also known as Knowledge Discovery in Databases—KDD) has been defined as "The nontrivial extraction of implicit, previously unknown, and potentially useful information from data." Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

A Bayesian network is a graphical statistical model that encodes probabilistic relationships among variables of interest. Over the last decade, the Bayesian network has become a popular representation for encoding uncertain expert knowledge in expert systems. More recently, researchers have developed methods for learning Bayesian networks from data. When used in conjunction with statistical techniques, the graphical model has several advantages for data analysis. First, because the model encodes dependencies among all variables, it readily handles situations where some data entries are missing. Second, a Bayesian network can be used to learn causal relationships, and hence can be used to gain understanding about a problem domain and to predict the consequences of intervention. Third, because the model has both a causal and probabilistic semantics, it is an ideal representation for combining prior knowledge (which often comes in causal form) and data. And fourth, Bayesian statistical methods in conjunction with Bayesian networks offer an efficient and principled approach for avoiding over fitting of data.

Statistical models can include such models as decision trees and decision graphs. A decision tree data structure corresponds generally to an acyclic, undirected graph where nodes are connected to other respective nodes via a single path. The graph is acyclic in that there is no path that both emanates from a vertex and returns to the same vertex, where each edge in the path is traversed only once. A probabilistic decision tree is a decision tree that is used to represent a conditional probability distribution for a target variable given some set of predictor variables. As compared to a table, which is another way to represent a conditional probability distribution when all variables are discrete, a tree is generally a more efficient way of storing probabilities because of its ability to represent equality constraints within a conditional probability distribution.

A decision graph is a further generalization of a decision tree. Similar to a decision tree, a decision graph can represent equality constraints in a conditional probability distribution. In contrast to a decision tree, however, non-root nodes in a decision graph can have more than one parent. This characteristic enables a richer set of relationships to be represented by a decision graph than by a decision tree. For example, relationships between a non-root node and multiple parent nodes can be represented in a decision graph by corresponding edges interconnecting the non-root node with its parent nodes.

There are two traditional approaches for constructing statistical models, such as decision trees or decision graphs, namely, a knowledge-based approach and a data-based approach. Using the knowledge-based approach, a person (known as a knowledge engineer) interviews an expert in a given field to obtain the knowledge of the expert about the field of expertise of the expert. The knowledge engineer and expert first determine the distinctions of the world that are important for decision making in the field of the expert. These distinctions correspond to the variables in the domain of interest. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the data-based approach, the knowledge engineer and the expert first determine the variables of the domain. Next, data is accumulated for those variables, and an algorithm is applied that creates one or more decision graphs from this data. The accumulated data comes from real world instances of the domain. That is, real world instances of decision making in a given field.

Typically, the data-based approach is more commonly utilized from a general stand point. Over the last few years, however, the sizes of these databases have been exponentially increasing as the ability to gather data more efficiently increases. This has produced enormous databases that take immense amounts of time to analyze, despite the ever increasing speeds gained in computer processing technology and storage access techniques.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data analysis, and more particularly to systems and methods utilizing scalable methods for learning Bayesian networks. Scalable learning methods are leveraged to efficiently obtain a Bayesian network for a set of variables of which the total ordering in a domain is known. Certain criteria are employed to generate a Bayesian network which is then evaluated and utilized as a guide to generate another Bayesian network for the set of variables. Successive iterations are performed utilizing the prior Bayesian network as a guide until a stopping a criterion is reached, yielding a best-effort Bayesian network for the set of variables. By efficiently obtaining conditional distributions utilizing the present, users gain an ability to analyze large datasets quickly and in a scalable manner.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
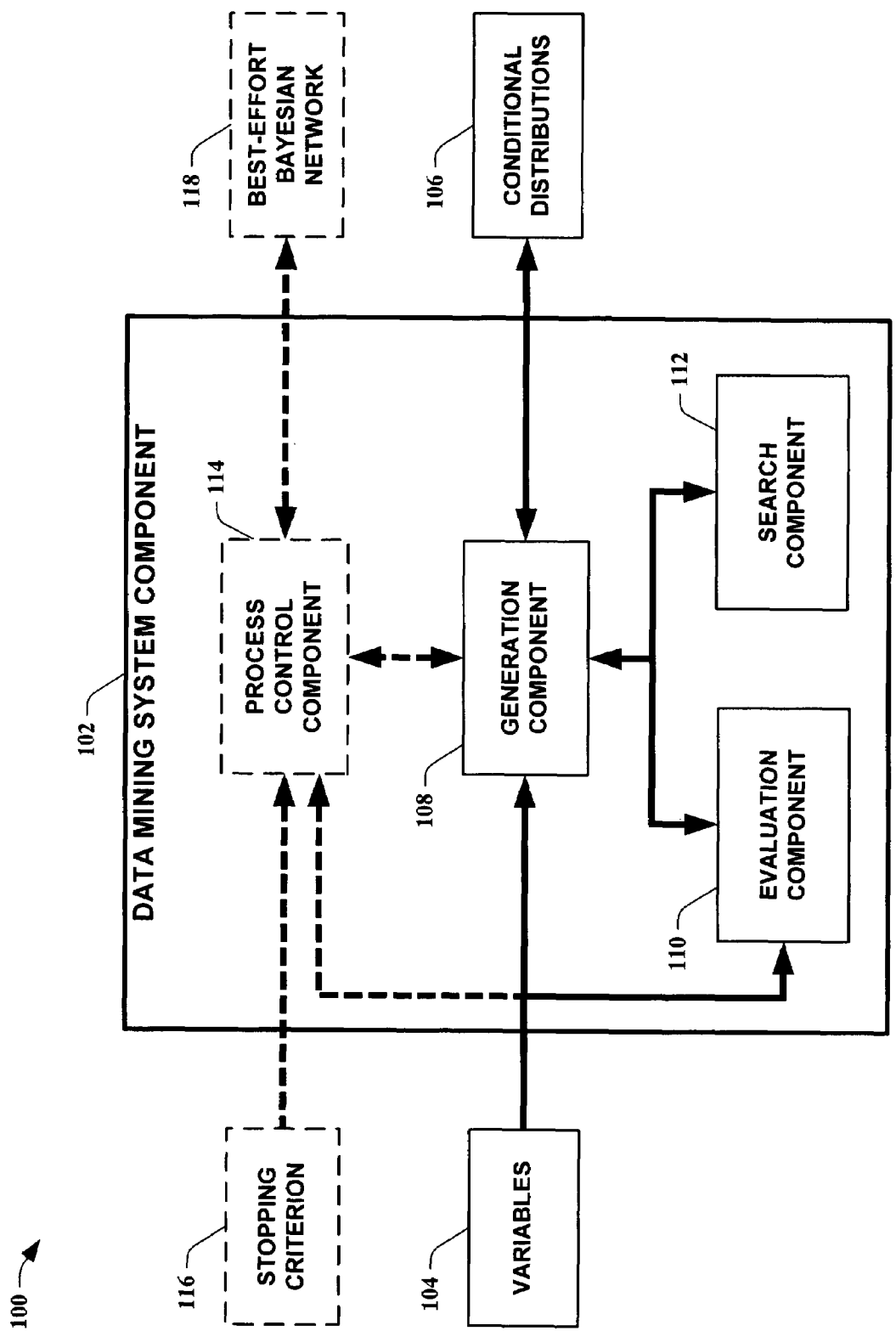
FIG. 1 is a block diagram of a data mining system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. It is to be appreciated that a model, network, query engine, user interface, comparator, model (or pattern) as described herein can be computer components.

The present invention provides improved data mining systems and methods of generating a Bayesian network, employing scalable algorithms that learn individual local distributions (e.g., decision trees) to build a Bayesian network (i.e., a set of local distributions that contains no cycle of predictor to target relations) in a scalable manner. The present invention utilizes certain criteria to generate a Bayesian network over a set of variables of which a total ordering of the variables in a domain is known, and then evaluates it. It then generates another Bayesian network for the variables, utilizing the prior one to guide it. Successive iterations are performed until a stopping criterion is reached.

The present invention leverages scalable learning methods to obtain statistical models that could not previously be learned in a scalable manner. A scalable learning method, among other things, is able to operate when data is too large for RAM (random access memory) and must be paged in from a storage device (e.g., a hard disk) as needed. Previously, non-scalable methods were utilized when scalable ones were not available. As a result, a user would either have extremely long waits for results, or be forced to sub-sample data and often learn models with lower quality. Users could also develop scalable versions of existing learning methods when needed, but this is a difficult and error prone procedure.

The present invention facilitates systems and methods in searching among orderings. If a total ordering of a set of variables in a domain is known, one instance of the present invention can learn a Bayesian network utilizing an algorithm known as the "random K2 search algorithm" (see, Cooper, G. and Herskovits, E.; A Bayesian Method For The Induction Of Probabilistic Networks From Data; *Machine Learning;* 9:309-347; 1992). In particular, given an ordering $\{x_1, \ldots, x_n\}$, a conditional probability for variable $x_i$ can be constructed by allowing as predictors only those variables that precede $x_i$ in the ordering. It follows that a structure of the resulting Bayesian network (i.e., a graph containing a node for every variable and an edge from x to y if x is included in y's conditional distribution) is acyclic. Thus, given a total ordering, a standard scalable algorithm to learn each conditional distribution can be applied without that algorithm needing to incorporate any extra logic about avoiding cycles. Some examples of conditional distributions are decision trees, neural networks, and logistic regressions. The quality of a resulting Bayesian network is sensitive to the total ordering provided to the random K2 search algorithm.

In FIG. 1, a block diagram of a data mining system 100 in accordance with an aspect of the present invention is illustrated. The data mining system 100 is comprised of a data mining system component 102, input variables 104, and output conditional distributions 106. The conditional distributions 106 can include, for example, decision trees, neural networks, and logistic regressions and the like. The data mining system component 102 is comprised of a generation component 108, an evaluation component 110, and a search component 112. The generation component 108 generates conditional distributions 106 based upon the input variables 104. It 108 accomplishes this by generating acyclic Bayesian networks over the input variables 104 based on an ordering that is a function of edge scores of the Bayesian network. Each edge score is a function of all edge scores of previous Bayesian network structures and their scores for the same input variables 104. In other words, each edge score is an aggregate function of individual Bayesian network scores from previous samples (i.e., generated networks). The generation component 108 employs a search method provided by the search component 112 such as, for example, the random K2 search algorithm. The ordering is a random ordering that is chosen randomly but is biased in favor of certain orderings based on all previous evaluations. The ordering can depend, for example, on magnitudes of the edge scores and/or relativity of the edge scores and the like. The certain orderings can include, for example, orderings based on preceding variables ordered by highest edge value while constrained by prior determined precedings (e.g., removal of edges inconsistent with a partial order defined by an order graph, despite their weighting). A total ordering of the variables 104 for a given domain is required before the variables 104 can be processed by the present invention. The evaluation component 110 evaluates the Bayesian network generated by the generation component 108.

The data mining system 100 can additionally be comprised of an optional processing control component 114, an optional input stopping criterion 116, and an optional output best Bayesian network 118. The processing control component 14 drives the generation component 108 to generate new Bayesian networks, employing prior generated networks as a guide. Additionally, the processing control component 114 can iteratively drive the generation component 108 to generate new Bayesian networks until a stopping criterion 116 is reached. The processing control component 114 can also identify the best-effort (i.e., current, highest-scoring model) Bayesian network 118 from the generated Bayesian networks. Although illustrated as a separate component, the processing control component 114 can be part of the generation component 108 in other instances of the present invention. Likewise, the evaluation component 110 and/or the search component 112 can also be part of the generation component 108.

In general, the present invention utilizes a process that first uniformly selects a random ordering "O" for a set of variables. Then a Bayesian network is learned utilizing a search method, for example, the K2 search algorithm, along with the ordering O. In the K2 search method, the initialization phase consists of choosing an ordering over the variables in a set. In the search phase, the K2 algorithm considers each node $x_i$ in the order, and learns a local distribution for $x_i$ using $\{x_1, \ldots, x_{i-1}\}$ as the candidate predictor nodes. For example, if the local distribution for $x_i$ is a decision tree, the K2 algorithm can employ a standard (and scalable) decision-tree learning algorithm for each $x_i$, where only nodes from the predecessors of $x_i$ in the order are allowed as potential splits in the tree. After learning all local distributions, the edges of the Bayesian network are defined by the predictors that participate in each local distribution. In particular, if the local distribution for $x_i$ is a function of $x_j$, then there is an edge from $x_j$ to $x_i$ in the Bayesian network. Due to the fact that a local distribution for $x_i$ can only depend on nodes that precede $x_i$ in the total ordering O, the Bayesian network that results from the K2 search method is necessarily acyclic. The resulting Bayesian network is then evaluated for fit over the set of variables. At this juncture, a determination can be made to see if the fit is satisfactory or not. If the fit is satisfactory, all of the identified Bayesian networks can be returned and/or a subset of all of the identified Bayesian networks can be returned. However, the fit might not be satisfactory and, thus, a new ordering O can be selected in a random fashion that is biased in favor of certain orderings based on all previous Bayesian network evaluations. The new ordering is biased based on scores of previous iterations. The present invention utilizes at least one random sample that is not uniform, distinguishing it from a standard randomized K2 approach. A new Bayesian network is then learned utilizing the search method and the new ordering O. The process can be repeated until a stopping criterion is reached. The stopping criterion can be, for example, a length of time, a quality of fit to a variable set, and/or a set number of process cycle iterations, and the like.

In order to describe the present invention, the following notation is adopted. Let $O_i$ denote the ith ordering considered by the algorithm, let $B_i$ denote the Bayesian network learned by the K2 algorithm using ordering $O_i$, and let $S_i$ denote the score for the network $B_i$. Thus, as described in the previous paragraph, $O_1$ is chosen randomly, and the algorithm chooses $O_j$ for all j>1 in a manner that is biased based on the scores $\{S_1, \ldots, S_{j-1}\}$. The present invention uses an edge graph to define how to select each (biased) order. An edge graph is a graph that contains a directed edge in both directions between every pair of nodes. The algorithm constructs an edge graph after each iteration of the algorithm; $E_i$ is used to denote an edge graph that the algorithm constructs in order to define ordering $O_i$. Associated with each edge in the edge graph $E_i$ is a weight that depends on the learned networks from previous iterations of the algorithm. For the initial edge graph $E_i$, all edge-graph edge weights are zero. As an example, consider previous scores for edges of an edge graph with three variables A, B, and C (i.e., nodes).

TABLE 1

EDGE GRAPH SCORES

| SCORE | $S_1$ | $S_2$ | $S_3$ |
|---|---|---|---|
| ORDER | $O_1$ | $O_2$ | $O_3$ |
| EDGES IN | A→B | B→A | C→A |
| $B_i$ | B→C | B→C | C→B |

Associated with each column i in Table 1 is a total order $O_i$ over the nodes. The edges listed in column i are the edges in $B_i$ learned by the K2 algorithm when using that order.

An example of method to assign weights to edges in an edge graph is now described. For an edge X→Y, $W_i(X→Y)$ is utilized to denote the weight assigned to X→Y in the edge graph $E_i$. The most general form of present invention prescribes that $W_i(X→Y)$ is an arbitrary function of:

(1) The set of previous scores $S_i=\{S_1, \ldots, S_{i-1}\}$.
(2) The set of "directions" (i.e. X→Y, X←Y or no edge) of the edge between X and Y in each network $\{B_1, \ldots, B_{j-1}\}$.

That is:

$$W_i(X→Y)=f(S_i, D_i) \text{ (General Equation)} \qquad \text{Eq. (1)}$$

where $D_i$ is the set of directions and f is an arbitrary function.

A useful specialization of one instance of the invention has an edge-weight for an edge X→Y defined in terms of the average and the standard deviation of all scores, but the only individual Bayesian-network scores used are those corresponding to Bayesian networks that contain the edge X→Y. In other words, the specialization ignores any $S_j$ from $S_i$ for which the direction in $D_i$ is not X→Y. More precisely, the specialization has $W_i(X→Y)$ being a function of:

(1) The average of the scores $\{S_1, \ldots, S_{j-1}\}$, denoted by $\mu_i$.

(2) The standard deviation of the scores $\{S_1, \ldots, S_{j-1}\}$, denoted by $\sigma_i$.

(3) The set of scores $S_i(X \rightarrow Y)$ corresponding every network $B_j(j<i)$ for which $B_j$ contains the edge $X \rightarrow Y$.

That is:

$$W_i(X \rightarrow Y) = g(\mu_i, \sigma_i, S_i(X \rightarrow Y)) \quad \text{(Specialized Equation)} \quad \text{Eq. (2)}$$

where g is an arbitrary function.

An example of the function g for assigning each weight $W_i(X \rightarrow Y)$ to the edge graph is shown in Equation 3:

$$W_i(X \rightarrow Y) = g(\mu_i, \sigma_i, S_i(X \rightarrow Y)) = \sum_{S \in S_i(X \rightarrow Y)} \frac{S - \mu_i}{\sigma_i} \quad \text{Eq. (3)}$$

In other words, the weight in the edge graph is the sum of the relative (to the average) Bayesian-network scores for those networks that contain the edge $X \rightarrow Y$. Thus, if the edge $X \rightarrow Y$ tends to appear in lower- (higher-) than-average scoring Bayesian networks, the edge $X \rightarrow Y$ in the edge graph will have a low (high) score. Every edge in an edge graph will have a score, and these scores are utilized by the present invention to derive a new ordering from those scores. That is, $O_i$ is chosen based on the edge graph $E_i$ that contains, for each edge $X \rightarrow Y$, the edge weight $W_i(X \rightarrow Y)$. One skilled in the art will appreciate that a number of different methods can be utilized to accomplish this within the scope of the present invention.

In general, it is desirable to extract a total ordering from an edge graph by finding a complete DAG (i.e., a directed acyclic subgraph of an edge graph that contains, for every X and Y, either an edge $X \rightarrow Y$ or $Y \rightarrow X$) for which a sum of the edges in that DAG is large. One example of accomplishing this is greedily: choose the highest-scoring edge, remove all edges inconsistent with that edge, and repeat. As an alternative example, instead of taking the highest scoring edge at each step, randomly sample an edge (where the probability of choosing an edge is determined by its relative score) and then remove inconsistent edges and repeat.

Figure 2:
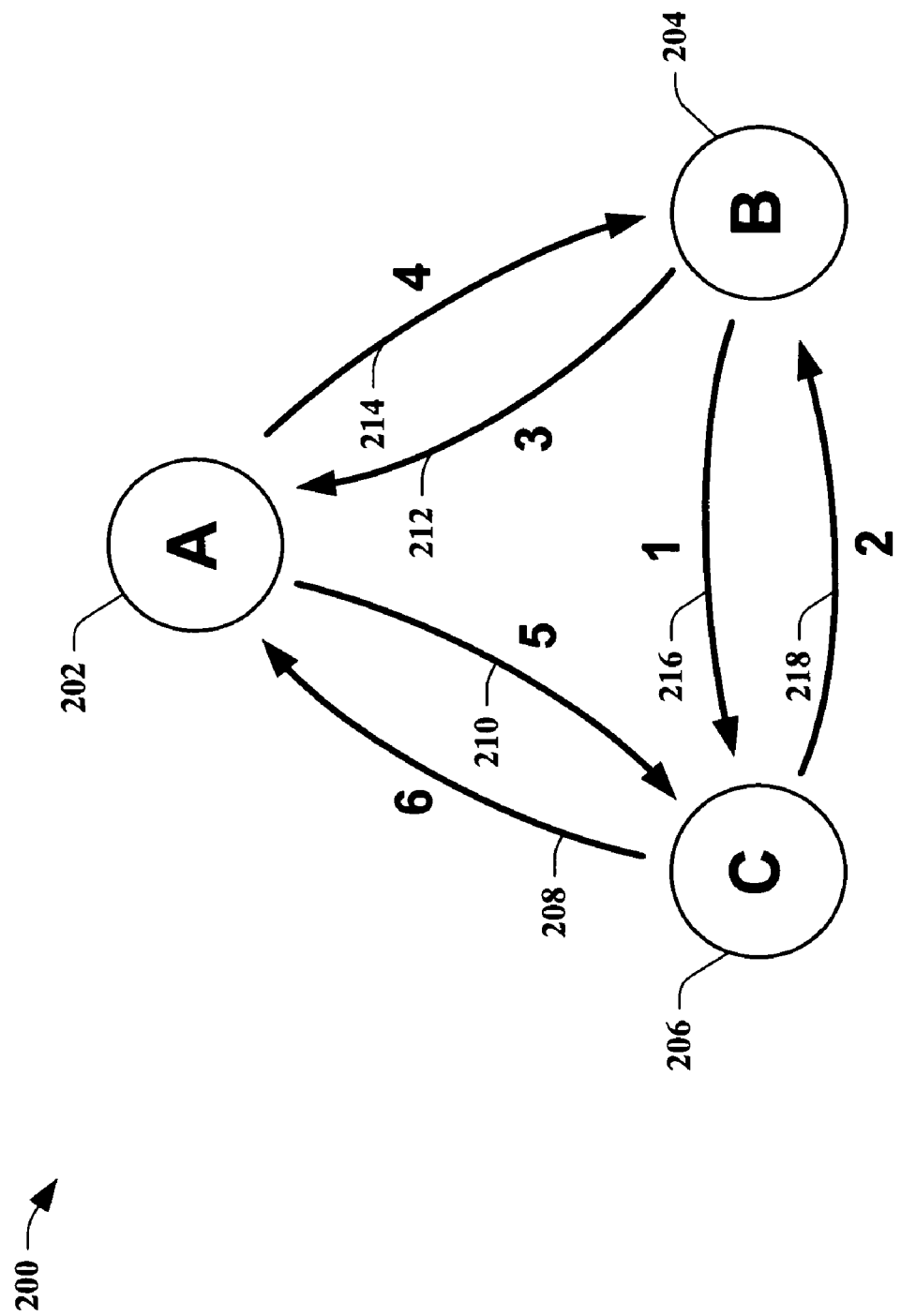
FIG. 2 is a diagram of an edge graph in accordance with an aspect of the present invention.
Figure 3:
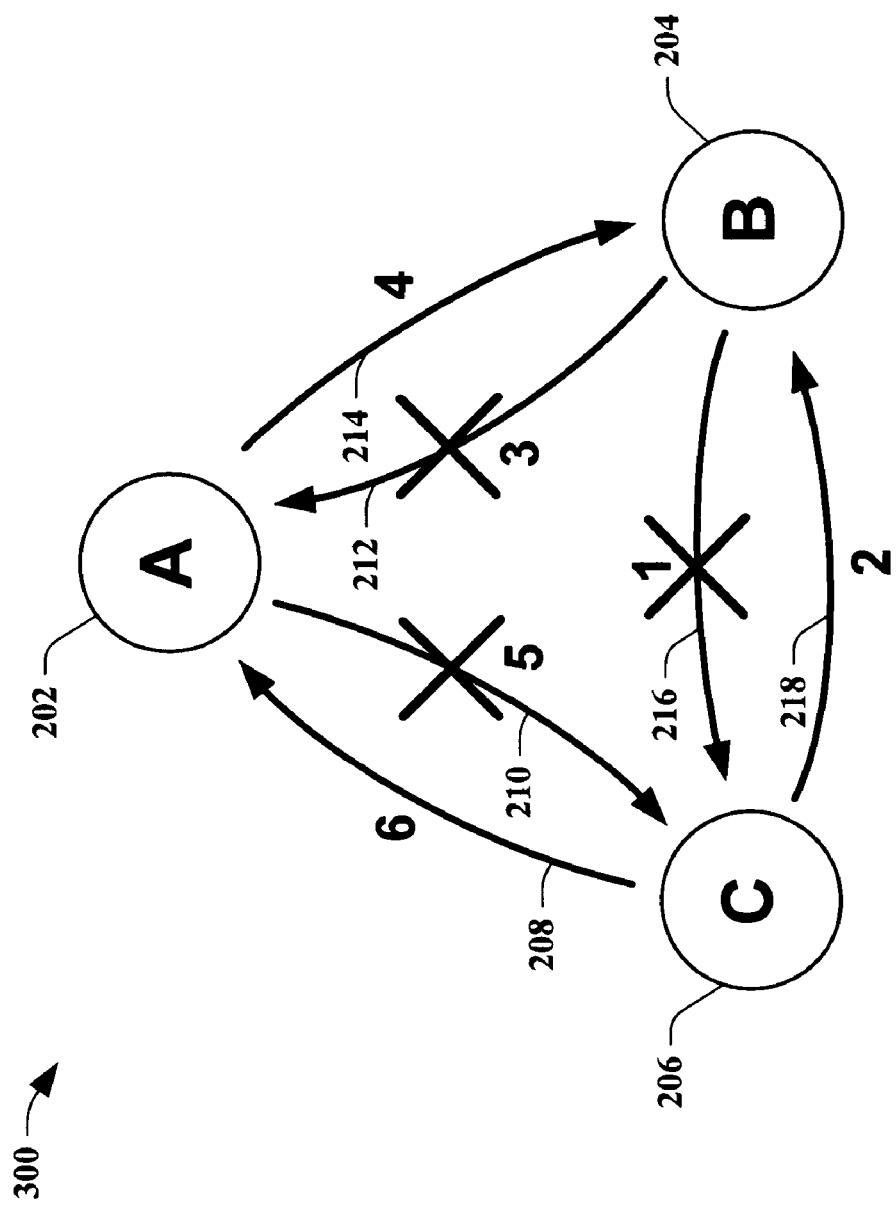
FIG. 3 is another diagram of an edge graph in accordance with an aspect of the present invention.
Figure 4:
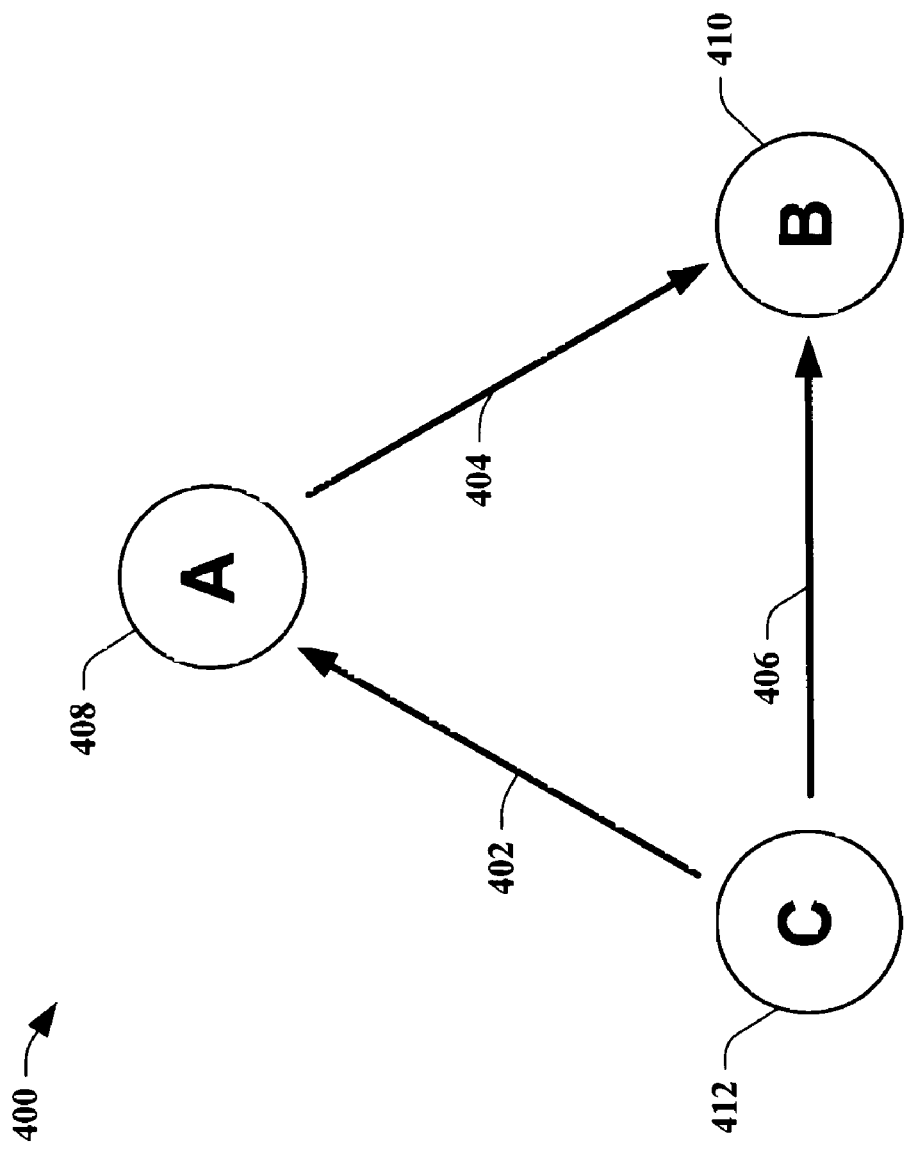
FIG. 4 is a diagram of an order graph in accordance with an aspect of the present invention.

For example, one instance of the present invention obtains edge scores and derives a new ordering in a greedy approach. Orderings are not taken totally random (e.g., ties can be chosen uniformly at random) in this example of the present invention, but are biased based on previous scores. Each edge score is an aggregate function of individual Bayesian network scores from previous samples as defined by the Specialized Equation (Eq. 2). First, consider an edge graph 200 illustrated in FIG. 2 with all edges 208-218 and their respective scores provided. The edges 208-218 represent directed relationships between variables A, B, and C 202-206 (i.e., nodes of the edge graph 200). In this example of one instance of the present invention, each edge 208-218 has a weight $W_i(\ )$ that is utilized to bias a determination for an ordering. The highest ordering edge of this example edge graph 200 is the C→A edge 208 with a weight (i.e., score) of 6. Thus, node "C" 206 "precedes" node "A" 202, defining a partial order. Edges that are inconsistent with this partial order are then removed from the edge graph 200. Therefore, if node "C" 206 precedes node "A" 202, the edge 210 of node "A" 202 to node "C" 206 is inconsistent since node "A" 202 cannot precede node "C" 206. In FIG. 3, another diagram of an edge graph 300 in accordance with an aspect of the present invention is depicted. This edge graph 300 illustrates that inconsistent edge 210 has been removed (i.e., "X'd" out). In FIG. 4, a diagram of an order graph 400 in accordance with an aspect of the present invention is shown. Consistent with the highest weighted edge 208 from the edge graphs 200, 300, an order graph edge 402 is added to the order graph 400 from node "C" 412 to node "A" 408.

After eliminating the A→C edge 210, the next highest weighted edge is the A→B edge 214. This provides an additional ordering of node "A" 202 preceding node "B" 204, providing an additional partial order. Therefore, if node "A" 202 precedes node "B" 204, the edge 212 of node "B" 204 to node "A" 202 is inconsistent since node "B" 204 cannot precede node "A" 202. Thus, edge graph 300 illustrates that the inconsistent edge 212 has been removed (i.e., "X'd" out). Consistent with the second highest weighted edge 214 from the edge graphs 200, 300, an order graph edge 404 is added to the order graph 400 from node "A" 408 to node "B" 410. In general, this process is continued until an order graph defines total ordering. By applying standard logic, since node "C" 206 precedes node "A" 202 and node "A" 202 precedes node "B" 204, node "B" 204 cannot precede node "C" 206. Therefore, B→C edge 216 is removed from the edge graph 300 as illustrated in FIG. 3 by an "X." By process of elimination, remaining C→B edge 218 becomes the third highest scoring edge in the edge graph 300 by default and provides the last partial order edge 406 to the order graph 400, providing a total ordering of (C,A,B). One skilled in the art will appreciate that this is just one means to accomplish this task and that other means are within the scope of the present invention.

Figure 5:
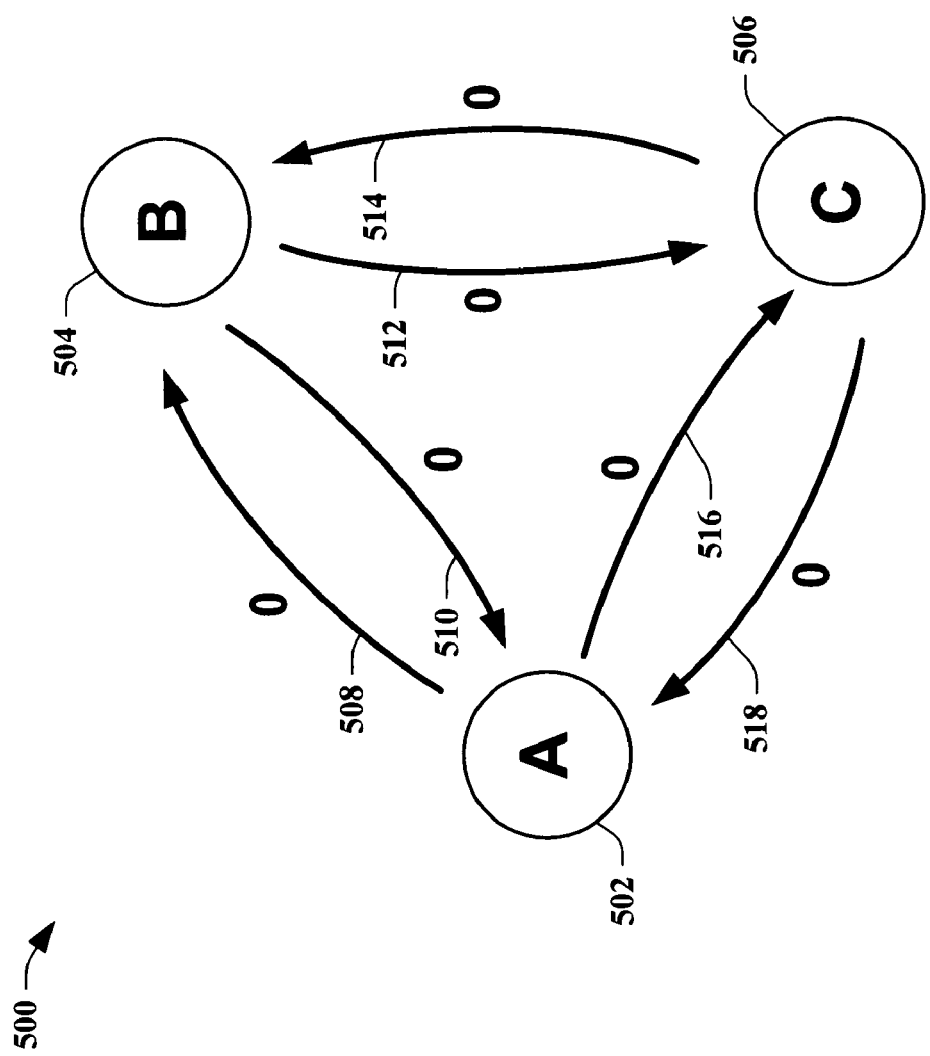
FIG. 5 is yet another diagram of an edge graph in accordance with an aspect of the present invention.

To illustrate how edge scores are derived, another example of one instance of the present invention is presented. In FIG. 5, yet another diagram of an edge graph 500 in accordance with an aspect of the present invention depicts a first cycle. Given a domain with A, B, and C nodes 502-506 as illustrated in FIG. 5, edge scores can be derived as follows. All edges 508-518 are initially given scores equal to zero. A first ordering is obtained at random. For this example, the first Bayesian network learned using the (random) first total ordering is given as A→B→C with a score of 10 as shown in Table 2 for a first iteration of the algorithm. This gives an average score of 10.

TABLE 2

| FIRST CYCLE EDGE GRAPH SCORING | |
|---|---|
| | SCORE = 10 |
| EDGES | A→B |
| | B→C |

Typically, a highest scoring edge is taken and its ties are broken at random. Then scores for edges are determined utilizing Eq. (3):

$$W_i(X \rightarrow Y) = g(\mu_i, \sigma_i, S_i(X \rightarrow Y)) = \sum_{S \in S_i(X \rightarrow Y)} \frac{S - \mu_i}{\sigma_i} \quad \text{Eq. (3)}$$

For simplification and illustrative purposes of this example, the standard deviation, $\sigma_i$, will not be utilized, and, thus, the following equation is employed:

$$W_i(X \to Y) = g(\mu_i, \sigma_i, S_i(X \to Y)) = \sum_{S \in S_i(X \to Y)} S - \mu_i \qquad \text{Eq. (4)}$$

For scoring the edge-graph edge A→B edge 508, take the sum over all learned structures that include A→B as an explicit edge (only one at this point). Thus, from Table 2, the A→B edge 508 has a score of 10 and the average is also 10. Therefore, utilizing Eq. (4) above (without $\sigma_i$), gives 10−10=0 as the score for A→B edge 508. Edges that do not appear are given a value of zero. Thus, edges 510, 514-518 are zero.

To further refine the edge graph 500 shown in FIG. 5, assume that a new subsequent learned order for a second cycle is {A,C,B}, and the resulting learned Bayesian network is A→B←C with scoring as shown in Table 3. This gives an average score of 15.

TABLE 3

EDGE GRAPH SCORING

|  | FIRST CYCLE | SECOND CYCLE |
|---|---|---|
| SCORE | 10 | 20 |
| EDGES | A→B | A→B |
|  | B→C | C→B |

Figure 6:
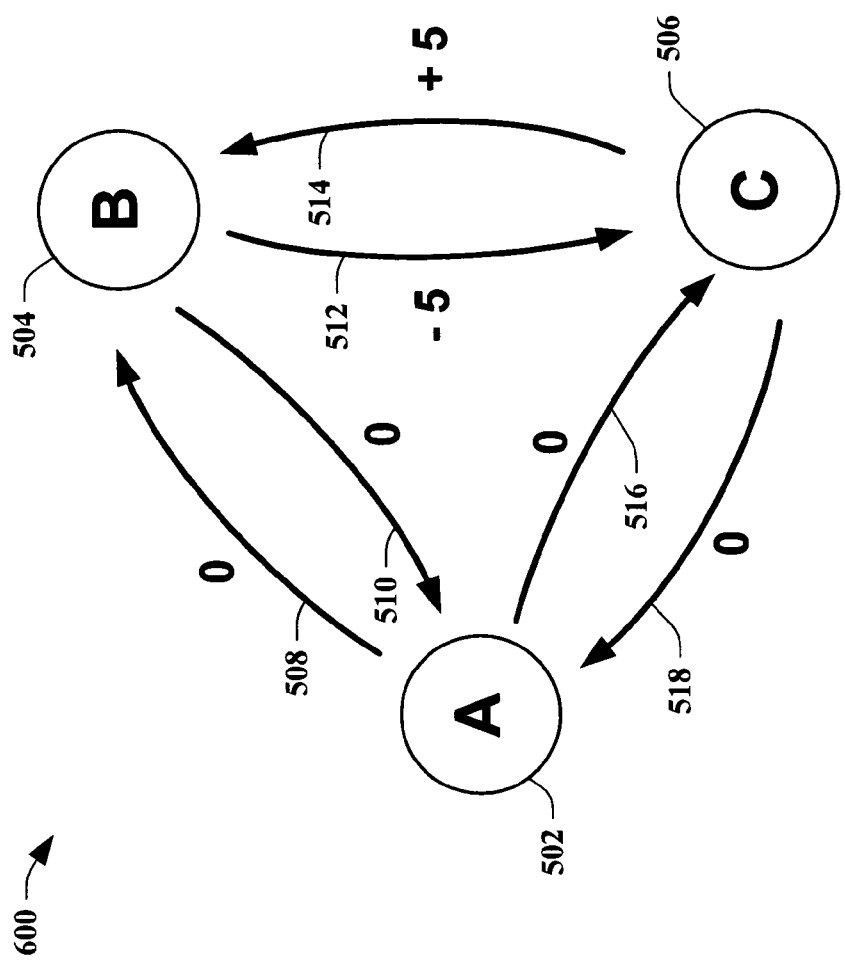
FIG. 6 is still yet another diagram of an edge graph in accordance with an aspect of the present invention.

In FIG. 6, still yet another diagram of an edge graph 600 in accordance with an aspect of the present invention illustrates a second cycle. Thus, as an illustrative calculation, A→B edge 508 is equal to [(first iteration edge score)−(second iteration average)]+[(second iteration edge score)−(second iteration average)]=[10−15]+[20−15]=0 (as indicated in FIG. 6). Similarly, B→C edge 512 has a calculated edge score of −5 (as indicated in FIG. 6) and C→B edge 514 has a calculated edge score of +5 (as indicated in FIG. 6). All other edges are equal to zero.

To even further refine the edge graph 600 shown in FIG. 6, assume that another new subsequent learned order for a third cycle is {C,A,B}, with resulting learned Bayesian network C→A→B with scoring as shown in Table 4. This gives an average score of 7.

TABLE 4

EDGE GRAPH SCORING

|  | FIRST CYCLE | SECOND CYCLE | THIRD CYCLE |
|---|---|---|---|
| SCORE | 10 | 20 | −9 |
| EDGES | A→B | A→B | A→B |
|  | B→C | C→B | C→A |
|  |  |  | C→B |

Figure 7:
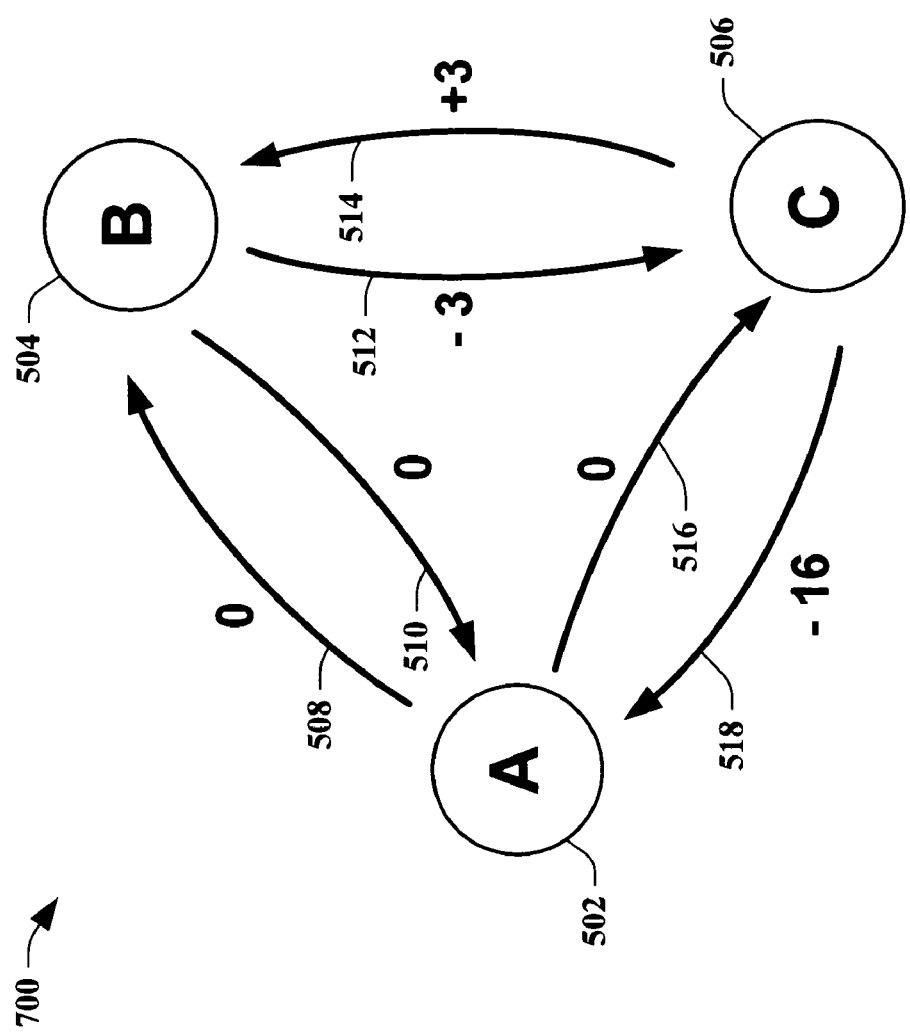
FIG. 7 is still yet another diagram of an edge graph in accordance with an aspect of the present invention.

In FIG. 7, still yet another diagram of an edge graph 700 in accordance with an aspect of the present invention illustrates a third cycle. Thus, as an illustrative calculation, A→B edge 508 is equal to [(first cycle edge score)−(third cycle average)]+[(second cycle edge score)−(third cycle average)]+[(third cycle edge score)−(third cycle average)]=[10−7]+[20−7]+[−9−7]=0 (as indicated in FIG. 7). Similarly, B→C edge 512 has a calculated edge score of −3 (as indicated in FIG. 7), C→B edge 514 has a calculated edge score of +3 (as indicated in FIG. 7), and C→A edge 518 has a calculated edge score of −16 (as indicated in FIG. 7). All other edges are equal to zero. Additional cycles can be repeated until a stopping criterion is reached such as, for example, a length of time, a quality of fit to a variable set, and/or a set number of process cycle iterations, and the like.

Although the above example depends on relativity, one skilled in the art will appreciate that other methods within the scope of the present invention can utilize magnitudes of scores as well.

Figure 8:
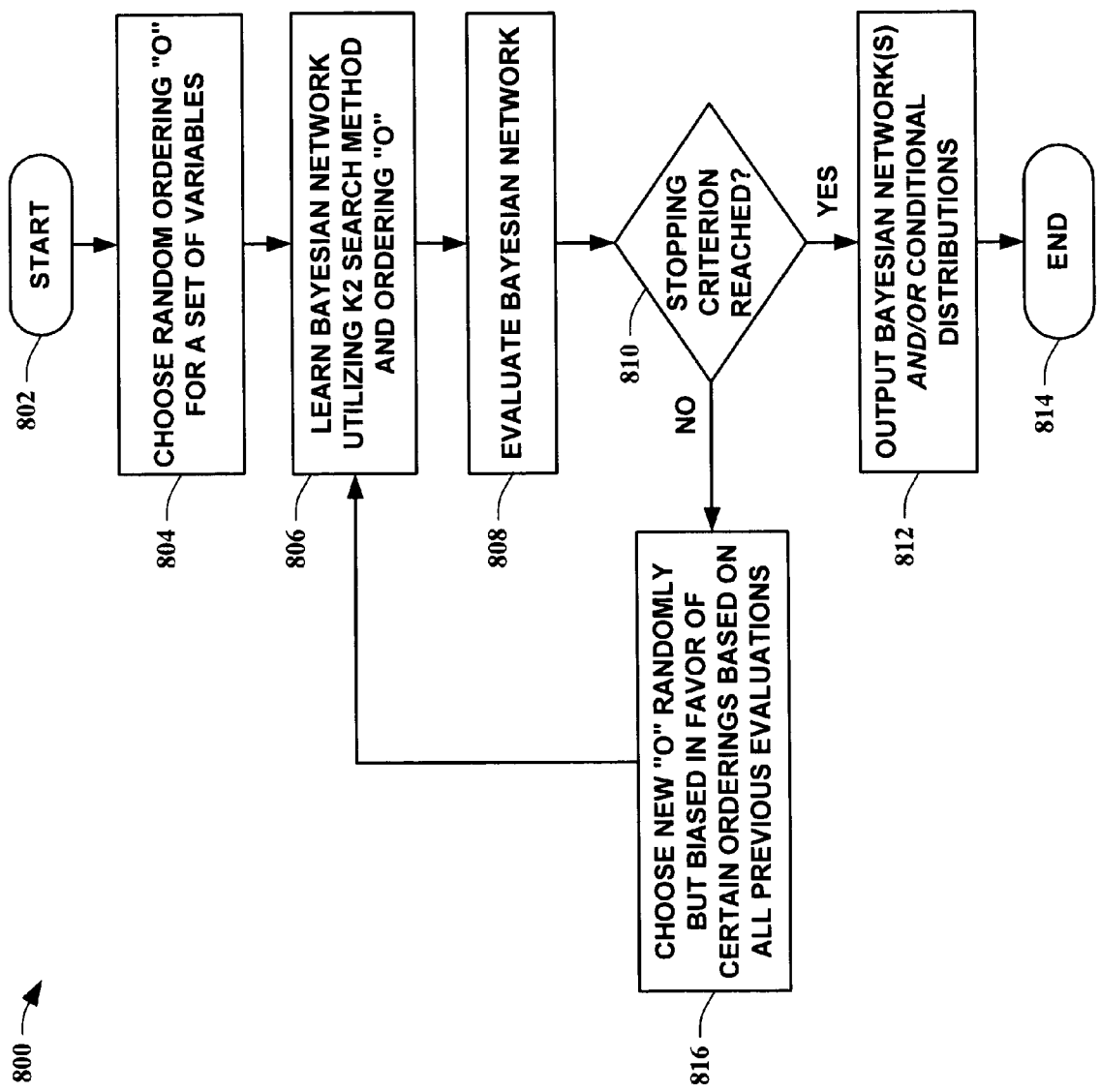
FIG. 8 is a flow diagram illustrating a method of learning Bayesian networks in accordance with an aspect of the present invention.
Figure 9:
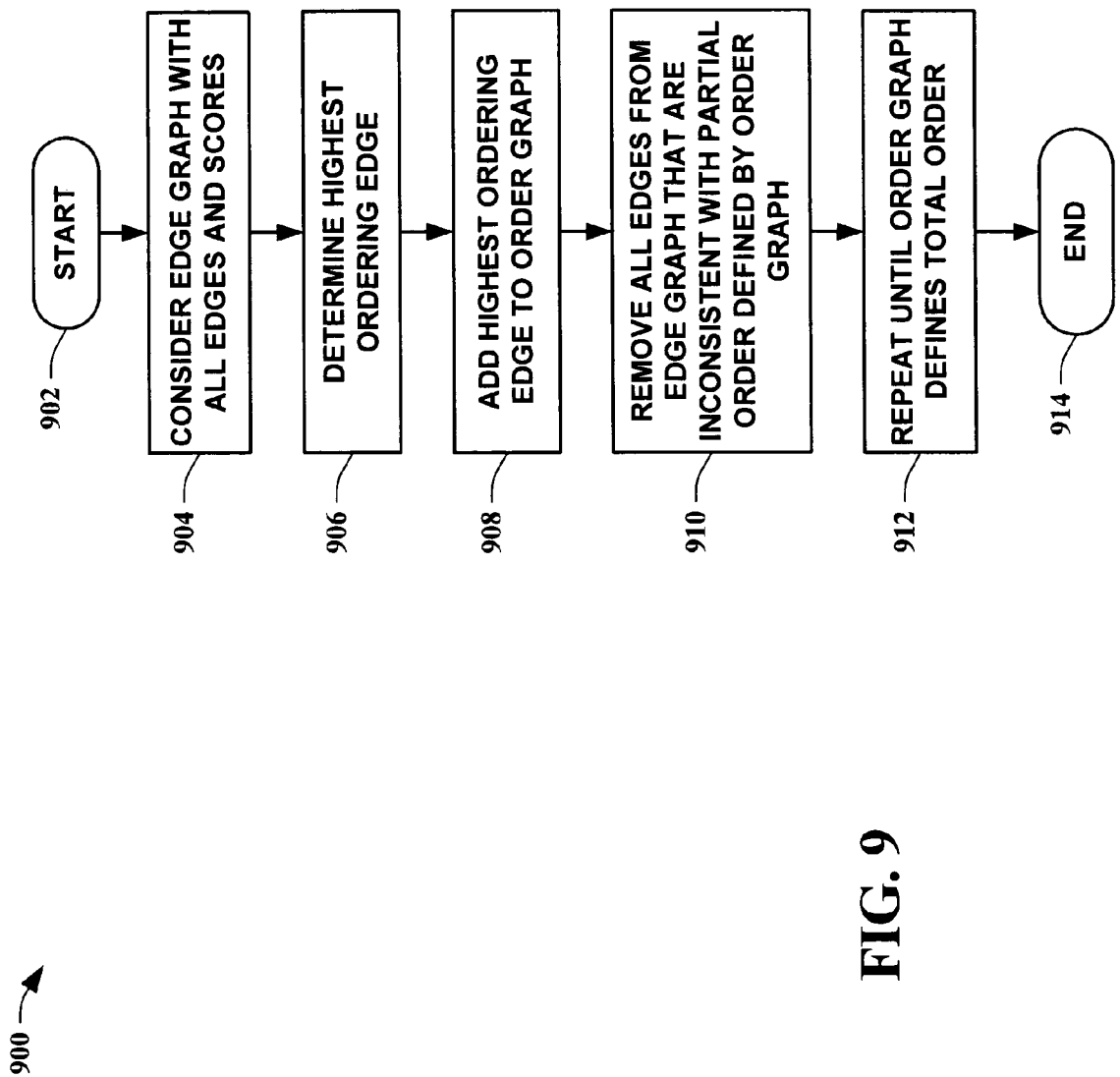
FIG. 9 is another flow diagram illustrating a method of learning Bayesian networks in accordance with an aspect of the present invention.

In view of the exemplary systems shown and described above, methodologies that may be implemented in accordance with the present invention will be better appreciated with reference to the flow charts of FIGS. 8-9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

In FIG. 8, a flow diagram illustrating a method 800 of learning Bayesian networks in accordance with an aspect of the present invention is shown. The method 800 starts 802 by selecting a random ordering O for a set of variables that have a known total ordering for a given domain 804. A Bayesian network is then learned by utilizing a search method such as, for example, the K2 search algorithm 806. The Bayesian network is then evaluated to determine a quality of fit over the set of variables 808. A determination is then made as to whether a stopping criterion has been met 810. The stopping criterion can be, but is not limited to, a length of time, a quality of fit to a variable set, and/or a set number of process cycle iterations, and the like. If the stopping criterion has been met, at least a subset of the learned Bayesian networks is output and/or at least one conditional distribution, such as, for example, a decision tree, a neural network, and a logistic regression, and the like is output 812, ending the flow 814. If, however, the stopping criterion has not been met 810, a new ordering O is randomly selected but biased in favor of certain orderings based on all previous evaluations 816. The ordering can depend, for example, on magnitudes of edge scores and/or relativity of the edge scores and the like. The certain orderings can include, for example, orderings based on preceding variables ordered by highest edge value while constrained by prior determined precedings. After selecting the new O ordering, the method 800 cycles again beginning with learning a new Bayesian network utilizing the search method with the new ordering O 806. The method 800 typically cycles (i.e., iterates) until the stopping criterion is met.

Referring to FIG. 9, another flow diagram illustrating a method 900 of learning Bayesian networks in accordance with an aspect of the present invention is depicted. The method 900 starts 902 by considering an edge graph with all edges and scores provided 904. Determine a highest ordering edge 906. This can be accomplished, for example, by ranking the edges according to weight (i.e., value). An edge with the highest weight indicates the highest ordering edge. Thus, this highest ordering edge is utilized to establish a certain ordering criterion that is followed to establish subsequent orderings (e.g., the highest ordering edge preceding state is a constraint on subsequent orderings). The highest ordering edge is then added to an order graph 908. All remaining edges that are inconsistent with a partial order defined by the order graph are removed 910. In this manner, the method 900 is repeated until the order graph defines a total ordering 912, ending the flow 914. This method 900 provides an iteration for establishing a new ordering that is utilized in conjunction with a search algorithm for learning a new Bayesian network in an overall process to provide a scalable method for learning Bayesian networks.

Figure 10:
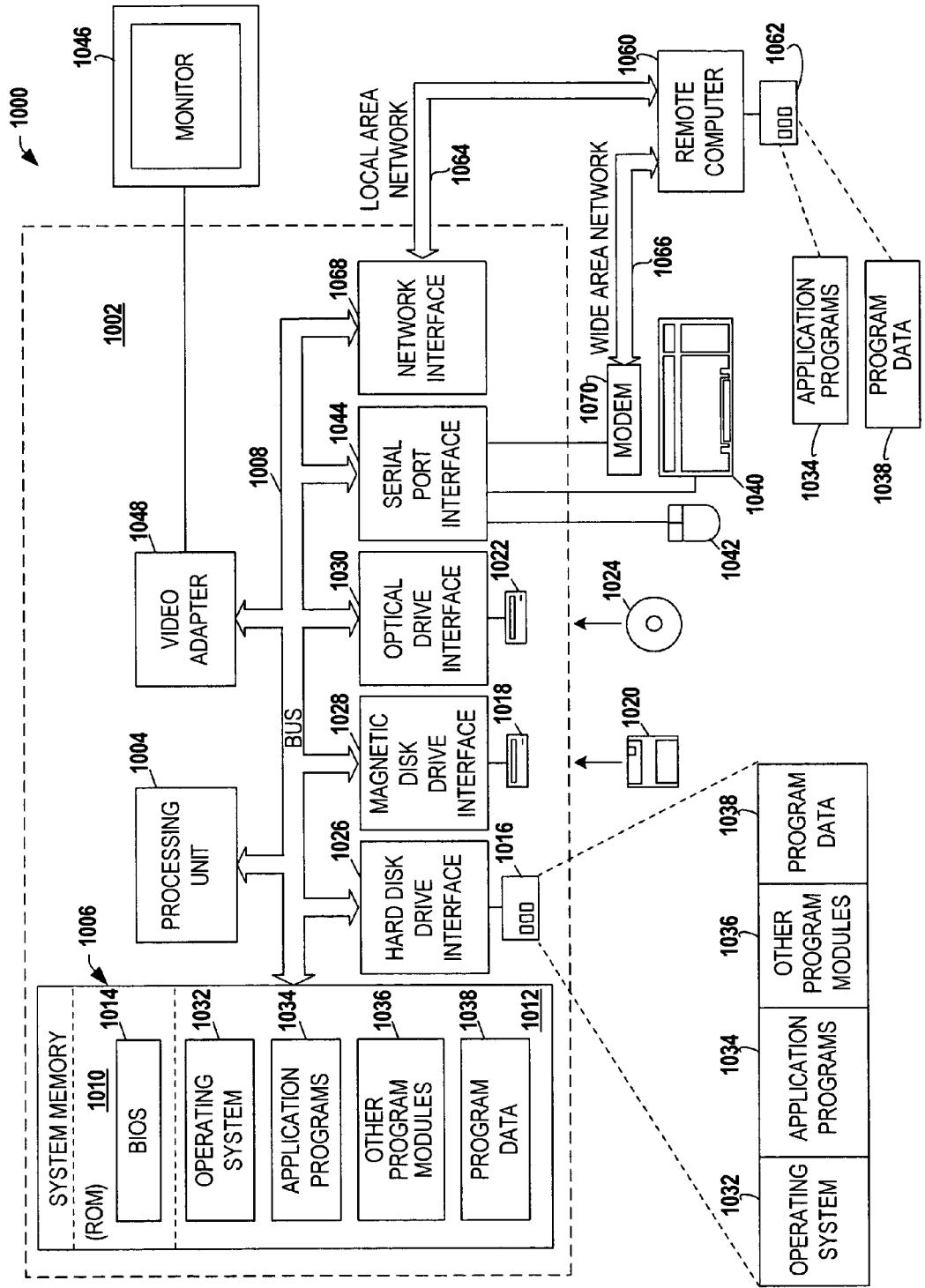
FIG. 10 illustrates an example operating environment in which the present invention can function.

In order to provide additional context for implementing various aspects of the present invention, FIG. 10 and the following discussion are intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Micro-channel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 and program modules 1036 can include a model (or pattern) and/or a dependency network that utilizes a data set in accordance with an aspect of the present invention. Additionally, the program data 1038 can include a Bayesian network evaluation scheme facilitating data mining in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 may include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

Figure 11:
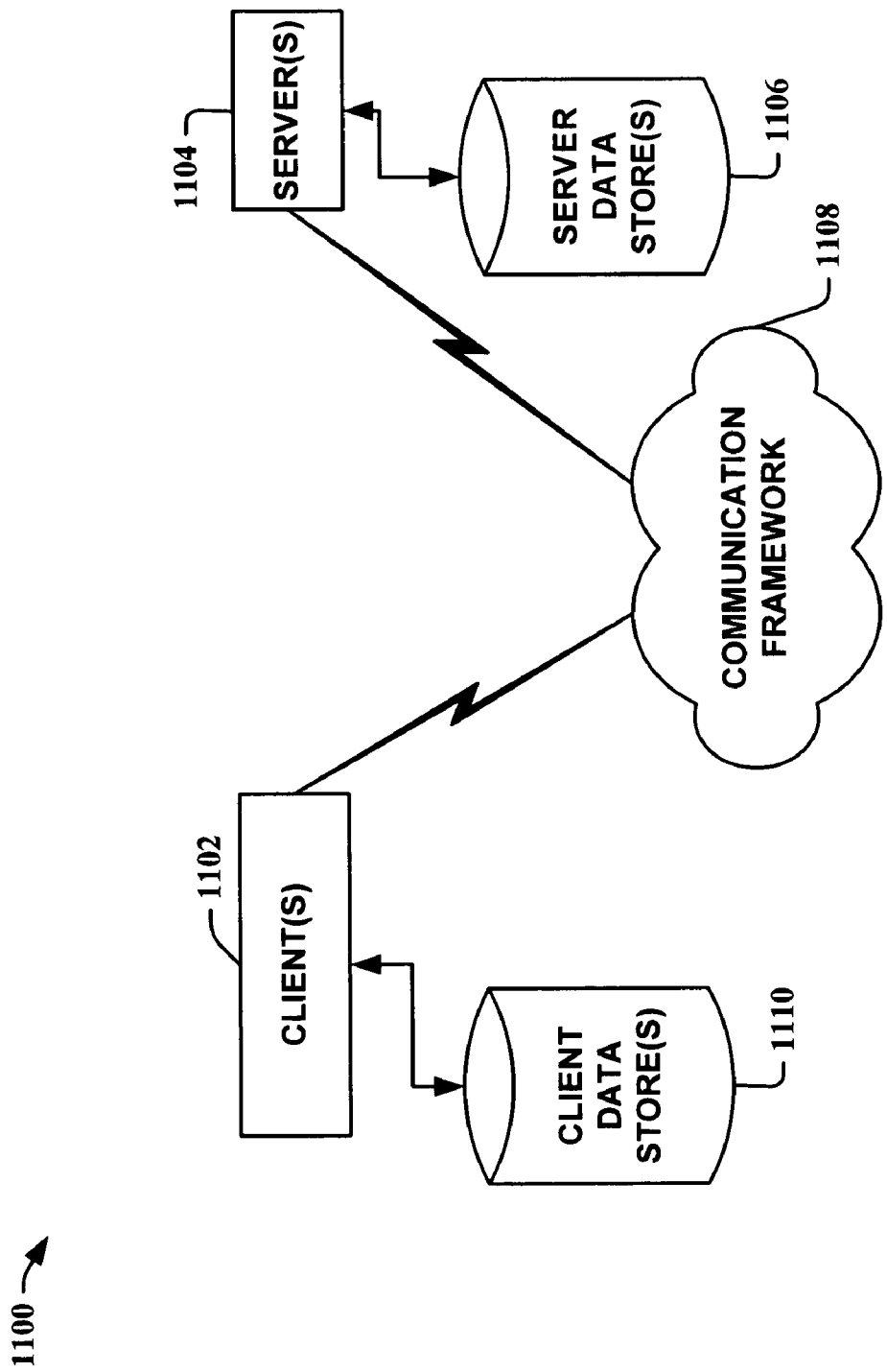
FIG. 11 illustrates another example operating environment in which the present invention can function.

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The system 1100 includes a communication framework 1108 that can be employed to facilitate communications between the client(s) 1102 and the server(s) 1104. The client(s) 1102 are operably connected to one or more client data store(s) 1110 that can be employed to store information local to the client(s) 1102. Similarly, the server(s) 1104 are operably connected to one or more server data store(s) 1106 that can be employed to store information local to the servers 1104.

It is to be appreciated that the apparatus, systems and/or methods of the present invention can be utilized in a Bayesian network evaluation scheme facilitating data mining employing computer components and non-computer related components alike. Further, those skilled in the art will recognize that the apparatus, systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates generating a Bayesian network to improve efficiency in data mining, comprising:
   a component that evaluates Bayesian network(s) generated over a set of variables; and
   a generation component that generates new Bayesian network(s) over the variables based on an ordering, utilizing at least one nonuniform random sample, that is a function of edge weights, each edge weight is a function of all previous network structures and their scores, the new Bayesian network(s) facilitates data mining.

2. The system of claim 1, the ordering depends on magnitudes of edge weights.

3. The system of claim 1, the ordering depends on relative scores of various learned networks.

4. The system of claim 1, further comprising:
   a processing control component that drives the generation component to generate new Bayesian network(s) and employs only prior generated network(s) as a guide.

5. The system of claim 4, the processing control component iteratively drives the generation component to generate new networks until a stopping criterion is reached.

6. The system of claim 5, the processing control component identifies a best-effort network of the generated networks.

7. The system of claim 1, the generation component employs a K2 search method.

8. The system of claim 1, the generation component generates only acyclic Bayesian networks.

9. The system of claim 1, the generation component generates a conditional distribution for variable $x_i$ by allowing as predictors only variables that precede $x_i$ in an ordering $\{x_1, \ldots, x_n\}$.

10. The system of claim 9, the conditional distribution comprising a decision tree.

11. The system of claim 9, the conditional distribution comprising a neural network.

12. The system of claim 9, the conditional distribution comprising a logistic regression.

13. The system of claim 1, the ordering is biased in favor of certain orderings based on the function of edge weights.

14. The system of claim 13, the certain orderings comprising preceding variables ordered by highest edge value while constrained by prior determined precedings.

15. The system of claim 14, the prior determined precedings comprising, at least in part, removal of edges inconsistent with a partial order defined by an order graph.

16. The system of claim 1, the function of edge weights comprising a general equation:

$$W_i(X \rightarrow Y) = f(S_i, D_i), \quad \text{Eq.(1)}$$

where $W_i(X \rightarrow Y)$ is a weight assigned to an edge $X \rightarrow Y$ in an edge graph $E_i$, $S_i$ is a set of previous scores, $D_i$ is a set of directions, and f is an arbitrary function based on $S_i$ and $D_i$.

17. The system of claim 1, the function of edge weights comprising a specialized equation:

$$W_i(X \rightarrow Y) = g(\mu_i, \sigma_i, S_i(X \rightarrow Y)), \quad \text{Eq. (2)}$$

where $W_i(X \rightarrow Y)$ is a weight assigned to an edge $X \rightarrow Y$ in an edge graph $E_i$, $\mu_i$ is an average of scores $\{S_1, \ldots, S_{j-1}\}$, $\sigma_i$ is a standard deviation of the scores $\{S_1, \ldots, S_{j-1}\}$, $S_i(X \rightarrow Y)$ is a set of previous scores corresponding to every network $B_j (j<i)$ for which $B_j$ contains the edge $X \rightarrow Y$, and g is an arbitrary function based on $\mu_i$, $\sigma_i$, $S_i(X \rightarrow Y)$.

18. The system of claim 17, the arbitrary function g comprising equation:

$$g(\mu_i, \sigma_i, S_i(X \rightarrow Y)) = \sum_{S \in S_i(X \rightarrow Y)} \frac{S - \mu_i}{\sigma_i}, \quad \text{Eq. (3)}$$

where S represents a Bayesian network score containing edge $X \rightarrow Y$.

19. The system of claim 17, the arbitrary function g comprising equation:

$$g(\mu_i, \sigma_i, S_i(X \rightarrow Y)) = \sum_{S \in S_i(X \rightarrow Y)} S - \mu_i, \quad \text{Eq. (4)}$$

where S represents a Bayesian network score containing edge $X \rightarrow Y$.

20. A computer-implemented method of facilitating Bayesian network generation to improve efficiency in analyzing data sets, comprising:
    evaluating Bayesian network(s) generated over a set of variables; and
    generating new Bayesian network(s) over the variables based on an ordering, utilizing at least one nonuniform random sample, that is a function of edge weights, each edge weight is a function of all previous network structures and their scores;
    utilizing the new Bayesian network(s) to facilitate analysis of data sets to learn information.

21. The method of claim 20, the ordering depends on magnitudes of edge weights.

22. The method of claim 20, the ordering depends on relative scores of previously learned networks.

23. The method of claim 20, the generating new Bayesian network(s) including generating a conditional distribution for variable $x_i$ by allowing as predictors only variables that precede $x_i$ in an ordering $\{x_1, \ldots, x_n\}$.

24. The method of claim 23, the conditional distribution comprising at least one selected from the group consisting of a decision tree, a neural network, or a logistic regression, or a combination thereof.

25. The method of claim 20, further comprising:
    employing a search method that requires a total ordering on variables as input to facilitate in generating new Bayesian network(s).

26. The method of claim 25, the search algorithm comprising a K2 search method.

27. The method of claim 26, generating new Bayesian network(s) comprising:
    selecting a random ordering for the set of variables;
    learning a Bayesian network utilizing the K2 search method employing the random ordering;
    evaluating the Bayesian network to determine the edge weights; and
    choosing a new random ordering that is biased in favor of certain orderings based on all previous Bayesian network evaluations.

28. The method of claim 27, the certain orderings comprising preceding variables ordered by highest edge value while constrained by prior determined preceding states.

29. The method of claim 20, the function of edge weights comprising a general equation:

$$W_i(X \rightarrow Y) = f(S_i, D_i), \quad \text{Eq. (1)}$$

where $W_i(X \rightarrow Y)$ is a weight assigned to an edge $X \rightarrow Y$ in an edge graph $E_i$, $S_i$ is a set of previous scores, $D_i$ is a set of directions, and f is an arbitrary function based on $S_i$ and $D_i$.

30. The method of claim 20, the function of edge weights comprising a specialized equation:

$$W_i(X \rightarrow Y) = g(\mu_i, \sigma_i, S_i(X \rightarrow Y)), \quad \text{Eq. (2)}$$

where $W_i(X \rightarrow Y)$ is a weight assigned to an edge $X \rightarrow Y$ in an edge graph $E_i$, $\mu_i$ is an average of scores $\{S_1, \ldots, S_{j-1}\}$, $\sigma_i$ is a standard deviation of the scores $\{S_1, \ldots, S_{j-1}\}$, $S_i(X \rightarrow Y)$ is a set of previous scores corresponding to every network $B_j(j<i)$ for which $B_j$ contains the edge $X \rightarrow Y$, and g is an arbitrary function based on $\mu_i$, $\sigma_i$, $S_i(X \rightarrow Y)$.

31. The method of claim 30, the arbitrary function g comprising equation:

$$g(\mu_i, \sigma_i, S_i(X \rightarrow Y)) = \sum_{S \in S_i(X \rightarrow Y)} \frac{S - \mu_i}{\sigma_i}, \quad \text{Eq. (3)}$$

where S represents a Bayesian network score containing edge $X \rightarrow Y$.

32. The method of claim 30, the arbitrary function g comprising equation:

$$g(\mu_i, \sigma_i, S_i(X \rightarrow Y)) = \sum_{S \in S_i(X \rightarrow Y)} S - \mu_i, \quad \text{Eq. (4)}$$

where S represents a Bayesian network score containing edge $X \rightarrow Y$.

33. The method of claim 20, further comprising:
    optimizing the generating of new Bayesian network(s); and
    employing only prior generated Bayesian network(s) as a guide.

34. The method of claim 33, optimizing the generating of new Bayesian network(s) comprising:
    controlling the generating of new Bayesian network(s) iteratively until a stopping criterion is reached.

35. The method of claim 34, further comprising:
identifying a best-effort network of the generated Bayesian networks.

36. A computer-implemented system that facilitates networked system monitoring to improve efficiency in data analysis, comprising:
means for evaluating Bayesian network(s) generated over a set of variables; and
means for generating new Bayesian network(s) over the variables based on an ordering, utilizing at least one nonuniform random sample, that is a function of edge weights, each edge weight is a function of all previous network structures and their scores, the new Bayesian network(s) facilitates analysis of data to learn information.

37. A computer-implemented data packet transmitted between two or more computer components that facilitates data mining, the data packet comprising, at least in part, information relating to Bayesian network(s), the information including, at least in part, data related to Bayesian network(s) generation emanating from variables based on an ordering, utilizing at least one nonuniform random sample, that is a function of edge weights, each edge weight is a function of all previous network structures and their scores, the data packet facilitates data mining of information.

38. A computer readable medium having stored thereon computer executable components of the system of claim 1.

39. A device employing the method of claim 20 comprising at least one selected from the group consisting of a computer, a server, or a handheld electronic device, or a combination thereof.

40. A device employing the system of claim 1 comprising at least one selected from the group consisting of a computer, a server, or a handheld electronic device, or a combination thereof.

* * * * *